US011221883B2

(12) United States Patent
Bischel et al.

(10) Patent No.: US 11,221,883 B2
(45) Date of Patent: Jan. 11, 2022

(54) HIERARCHICAL SCHEDULER

(71) Applicant: Twilio Inc., San Francisco, CA (US)

(72) Inventors: David Tyler Bischel, San Jose, CA (US); Sam Nguyen, Bothell, WA (US); Timothy Jenkins, Riverside, CA (US); Vyacheslav Kim, Anaheim, CA (US); Eric Yongjun Choi, Yorba Linda, CA (US); Isaac Saldana, Irvine, CA (US)

(73) Assignee: Twilio Inc., San Francisco, CA (US)

( * ) Notice: Subject to any disclaimer, the term of this patent is extended or adjusted under 35 U.S.C. 154(b) by 212 days.

(21) Appl. No.: 16/738,814

(22) Filed: Jan. 9, 2020

(65) Prior Publication Data

US 2020/0409763 A1 Dec. 31, 2020

Related U.S. Application Data

(60) Provisional application No. 62/867,028, filed on Jun. 26, 2019.

(51) Int. Cl.
*G06F 9/50* (2006.01)
*G06F 9/48* (2006.01)

(52) U.S. Cl.
CPC .......... *G06F 9/5027* (2013.01); *G06F 9/4881* (2013.01)

(58) Field of Classification Search
None
See application file for complete search history.

(56) References Cited

U.S. PATENT DOCUMENTS

| 6,909,691 B1 * | 6/2005 | Goyal | G06F 9/4881 370/230 |
| 7,675,926 B2 * | 3/2010 | Olsen | H04L 47/326 370/412 |
| 8,315,369 B2 * | 11/2012 | Lawson | H04M 3/5235 379/220.01 |

(Continued)

OTHER PUBLICATIONS

Han et al.; "Workload-Adaptive Configuration Tuning for Hierarchical Cloud Schedulers"; IEEE 2019 (Han_2019.pfd; pp. 1-17) (Year: 2019).*

(Continued)

*Primary Examiner* — Hiren P Patel
(74) *Attorney, Agent, or Firm* — Schwegman Lundberg & Woessner, P, A.

(57) ABSTRACT

Methods, systems, and computer programs are directed to the implementation of configurable hierarchical schedulers with multiple levels, where each level may use one of several types of queueing mechanisms. A configurable, hierarchical scheduler is designed to handle large scale processing of requests (e.g., transmitting outgoing messages). The hierarchical scheduler distributes the loads to different queues handling different types of messages (e.g., by user ID, by Internet Address (IP), by schedule). The different layers of the hierarchical scheduler are configurable to queue and schedule traffic based on many factors, such as IP address, handling reputation, available downstream bandwidth, fairness, concurrency rates to handle multiple constraints, scheduling per client, time of delivery constrains, rate limits per user, domain scheduling per user, concurrency throttling per outbound channel, and sharing global rate limits across service processors.

19 Claims, 13 Drawing Sheets

(56) References Cited

U.S. PATENT DOCUMENTS

| | | | | |
|---|---|---|---|---|
| 8,547,899 | B2* | 10/2013 | Kish | H04W 80/04 |
| | | | | 370/328 |
| 8,869,150 | B2* | 10/2014 | Sundararaman | H04L 47/621 |
| | | | | 718/101 |
| 9,485,326 | B1* | 11/2016 | Ulman | H04L 49/9084 |
| 10,382,582 | B1* | 8/2019 | Frink | H04L 67/327 |
| 10,412,018 | B1* | 9/2019 | Feng | H04L 49/1546 |
| 2005/0047425 | A1* | 3/2005 | Liu | H04L 47/50 |
| | | | | 370/411 |
| 2005/0243853 | A1* | 11/2005 | Bitar | H04L 47/58 |
| | | | | 370/432 |
| 2011/0007687 | A1* | 1/2011 | Howe | H04W 72/1242 |
| | | | | 370/328 |
| 2011/0096666 | A1* | 4/2011 | Davari | H04L 47/215 |
| | | | | 370/235 |
| 2011/0194426 | A1* | 8/2011 | Fang | H04L 47/52 |
| | | | | 370/252 |
| 2012/0233623 | A1* | 9/2012 | van Riel | G06F 9/4881 |
| | | | | 718/103 |
| 2013/0336229 | A1* | 12/2013 | Kakadia | H04W 72/1257 |
| | | | | 370/329 |
| 2015/0016266 | A1* | 1/2015 | Dumitrescu | H04L 47/215 |
| | | | | 370/236 |
| 2015/0135183 | A1* | 5/2015 | Kipp | G06F 9/4881 |
| | | | | 718/103 |
| 2016/0142341 | A1* | 5/2016 | Panchagnula | H04L 49/9005 |
| | | | | 370/392 |
| 2019/0278523 | A1* | 9/2019 | Benisty | G06F 3/0629 |

OTHER PUBLICATIONS

Konoura et al. "Efficient Dequeuing Technique for Distributed Messaging Systems Processing Massive Message Volumes"; IEEE 2016; (Konoura_2016.pdf; pp. 1-6) (Year: 2016).*

French-Owen, Calvin, "Centrifuge: a reliable system for delivering billions of events per day", Segment Blog, [Online] Retrieved from the Internet: <URL: https://segment.com/blog/introducing-centrifuge/>, (May 23, 2018), 32 pgs.

* cited by examiner

| QUEUEING COMPONENTS | |
|---|---|
| HEAP QUEUE | SCHEDULES MESSAGE FOR A CERTAIN TIME |
| ROUND ROBIN QUEUE | SCHEDULE REQUESTS FROM MULTIPLE REQUESTERS IN CIRCULAR ORDER |
| RATE LIMIT QUEUE | ENFORCES RATE LIMITS OF MESSAGES PROCESSED PER PERIOD |
| CONCURRENCY QUEUE | ENFORCES LIMITS ON THE NUMBER OF MESSAGES INFLIGHT AT A GIVEN TIME |
| WORKER CONCURRENCY QUEUE | ENFORCES LIMITS ON THE NUMBER OF CONSUMERS ACTIVE AT A GIVEN TIME |

FIG. 7

HIERARCHICAL SCHEDULER

CLAIM OF PRIORITY

This application claims priority from U.S. Provisional Patent Application No. 62/867,028, filed Jun. 26, 2019, and entitled "Hierarchical Scheduler." This provisional application is herein incorporated by reference in its entirety.

TECHNICAL FIELD

The subject matter disclosed herein generally relates to methods, systems, and machine-readable storage media for scheduling tasks.

BACKGROUND

In systems where clients compete for resources, schedulers decide how to allocate the resources to the clients, such as the order of processing of the requests. In large systems, scheduling might be complicated because of the need to provide fairness in the allocation of resources, as well as some of the constraints on the system, such as taking into consideration external factors (e.g., inability to complete the task because of a lacking resource) to schedule the available resources among the different clients.

In some complex systems, there could be millions of queues where requests await service, and each of the queues may have independent throttling constraints for service delivery.

Further, in distributed systems, multiple workers may be allocated to work on requests, but the distribution of workers complicates the control over the whole system, such as imposing maximum rates on the incoming requests coming from a user. Further, some requests may take a second while others may take an hour, which may cause unreasonable delays on requesters that use low amounts of service bandwidth.

BRIEF DESCRIPTION OF THE DRAWINGS

Various ones of the appended drawings merely illustrate example embodiments of the present disclosure and cannot be considered as limiting its scope.

FIG. 7 shows queuing components available in the hierarchical scheduler, according to some example embodiments.

DETAILED DESCRIPTION

Example methods, systems, and computer programs are directed to the implementation of configurable hierarchical schedulers with multiple levels, where each level may use one of several types of queueing mechanisms. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A configurable, hierarchical scheduler is designed to handle large-scale processing of requests (e.g., transmitting outgoing messages). The hierarchical scheduler distributes the loads to different queues handling different types of messages (e.g., by user Identifier (ID), by Internet Address (IP), by time of delivery). The different layers of the hierarchical scheduler are configurable to queue and schedule traffic based on many factors, such as IP address, handling reputation, available downstream bandwidth, fairness, concurrency rates to handle multiple constraints, scheduling per client, time of delivery constraints, rate limits per user, email domain scheduling per user, concurrency throttling per outbound channel, and sharing global rate limits across service processors.

One of the configurable types of queues include queues with service rate limits, and the hierarchical scheduler implements rate limiting independently for each queue. This type of queue is useful for asynchronously scheduled work payloads and unburdens the end users from having to maintain state for retries due to processing failures. Rate limiting can be configured to apply at any level in the queue hierarchy. Further, rate limiting unburdens consumers from processing messages that the consumers would not be able to process (due to some other constraints, such as rate limits imposed by an email domain).

Another type of configurable queue includes queues with per-queue concurrency throttling. For example, to throttle concurrency of workers, in order to limit the amount of workers that may be activated to process items from a given queue.

Figure 1:
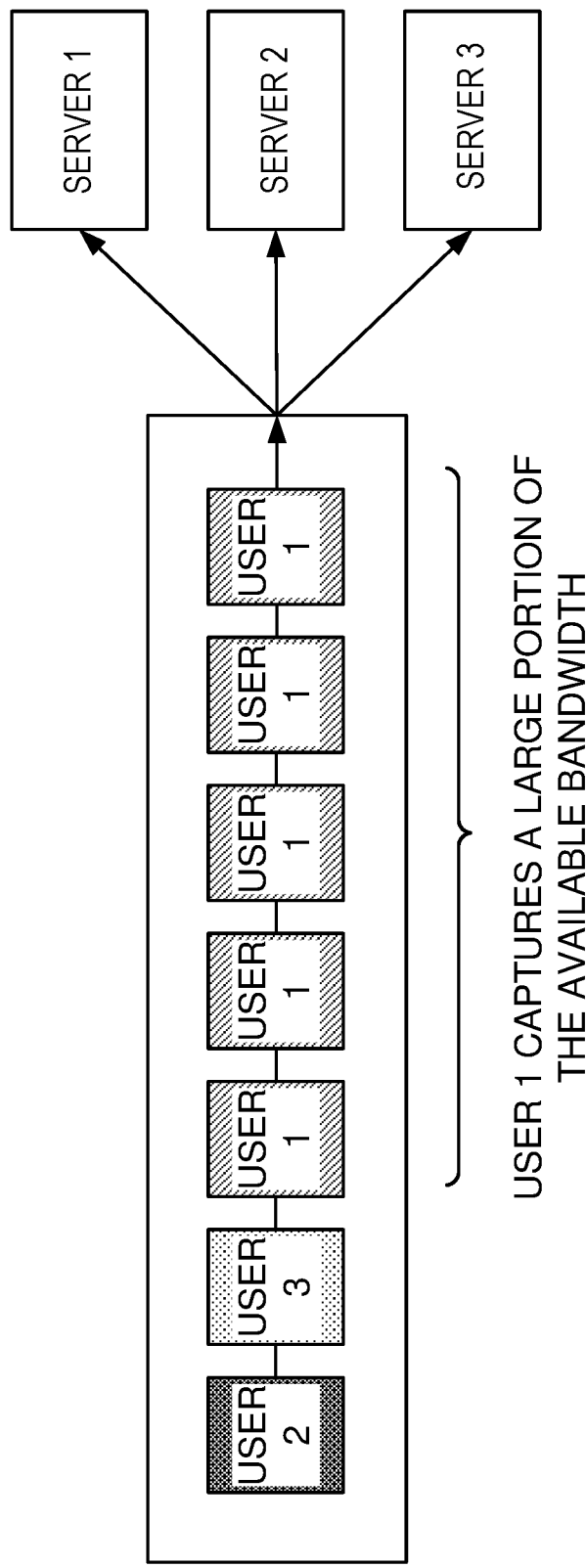
FIG. 1 illustrates the problem of unfair use of resources in a linear queue, according to some example embodiments.

FIG. 1 illustrates the problem of unfair use of resources in a linear queue, according to some example embodiments. FIG. 1 shows a typical problem in the linear queuing system, e.g., a first-in first-out (FIFO) queue. In this case, messages are processed as they come in. However, if a user is sending a large amount of requests (e.g., user 1 in this example), other users may suffer long delays in processing because the user with many requests fills up the processing queue.

Even if the processing is performed by different servers, such as server 1 for user 1, server 2 for user 2, etc., the request from user 2 will suffer a delay to be sent to server 2, even if server 2 is idle.

Figure 2:
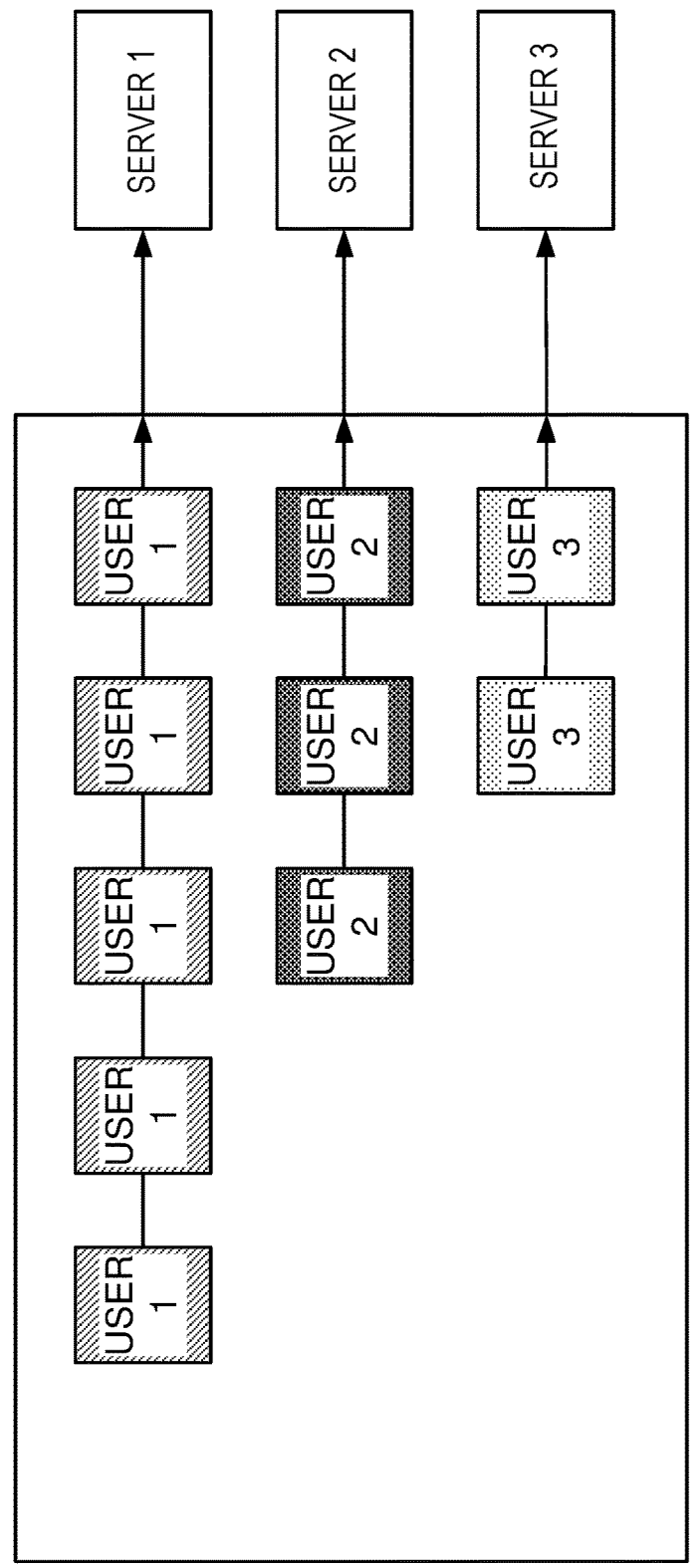
FIG. 2 illustrates the operation of a round-robin, per-user scheduler, according to some example embodiments.

FIG. 2 illustrates the operation of a round-robin, per-user scheduler, according to some example embodiments. This example shows different queues for each of the servers (e.g., for each of the users). The scheduler processes the request in a round-robin fashion by allocating service to each of the queues in order.

For example, a request from user 1 would be sent to server 1, then a request from user 2 would be sent to server 2, a request from user 3 would be sent to server 3, and the cycle repeats. In this case, the user with a large number of requests does not affect the performance of other users with a lower number of requests.

However, the round robin queue has limitations and cannot help with some of the needs of the complex scheduling system, such as different service rates from the servers downstream.

To operate large complex systems, a scheduler is needed that can handle large amounts of transactions in complex environments with different user needs and service rates from workers. Further, the scheduler must provide a diverse functionality to support different types of needs for different types of users.

A flexible, high-performance scheduler should meet a number of requirements. For example, an outside system should be able to view details of the queue, such as view queues that exist and the count of elements in the queues, view items in the queue, view concurrency levels for a queue, and view the health of a queue. A nonhealthy queue is, for example, a queue with a large number of items that have next attempt times in the past and that has a low concurrency level.

Further, the outside system should be able to manipulate queue elements, such as remove a specific item, remove items based on a search parameter, flush a queue, place a hold on a queue, create a new queue criteria, and delete a queue.

Further, the outside system should be able to connect to the queue manager and request a work item. Work items are distributed in a way that prevents large queues from starving out smaller queues.

Further, the scheduler should keep track of the work items that have been distributed to a worker and be able to recover if the worker terminates without sending a response for its work items. The scheduler keeps track of how long a worker has been working on a work item and if the worker does not finish processing the item within a predetermined amount of time, the item is made available for another worker to process, assuming that the original worker crashed or suffered some other type of problem.

Figure 3:
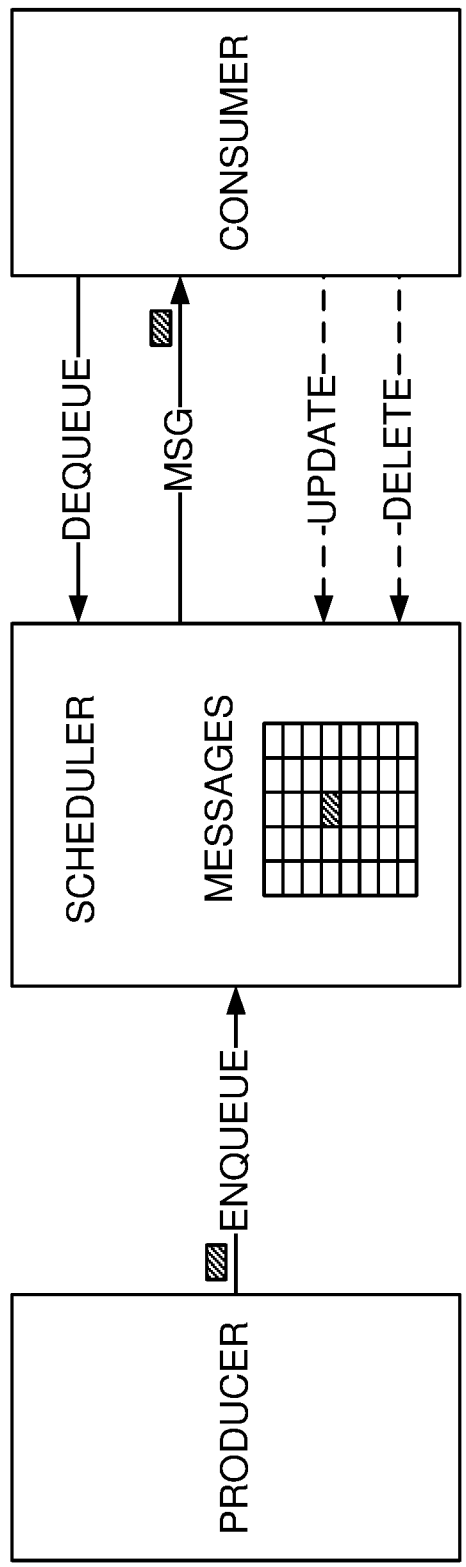
FIG. 3 illustrates the use of the scheduler by producers and consumers, according to some example embodiments.

FIG. 3 illustrates the use of the scheduler by producers and consumers, according to some example embodiments. The present embodiments are described with reference to a scheduling system to process message requests, and particularly, to send email messages to email services. However, the same principles may be utilized for any other type of scheduling systems where producers and consumers are used to process service requests. The embodiments illustrated for email message processing should therefore not be interpreted to be exclusive or limiting, but rather illustrative.

A producer generates an enqueue request to transfer a message to the scheduler. The scheduler then queues the message based on the configured scheduling hierarchy for the scheduler.

A consumer sends a dequeue request to receive a message for processing. In response, the scheduler transfers the message to the consumer. In some example embodiments, when using concurrency controls, the scheduler keeps the message in the scheduling hierarchy with a tag identifying that the message is being processed, also referred to herein as the message being inflight. In other example embodiments, the message is just rescheduled to be processed at a future time.

Once the consumer processes the message, a delete request is sent to the scheduler to delete the message from the scheduler's message queues. Further, the consumer may also send an update to the scheduler to change the state of the message, such as scheduling the message for the future or adding additional time to enable the consumer to process the message.

If the scheduler does not receive an update or a delete from the consumer within a threshold amount of time, then the scheduler assumes that the consumer has crashed or faulted in some other way, and the message will be made available for dequeue waiting for a new consumer to process the message.

In some example embodiments, more than one message may be transferred to the consumer for a single dequeue request. For example, the consumer may send a dequeue request to transfer up to ten messages to be sent to a given email domain (e.g., gmail.com).

One type of update is to reschedule the message for future processing. For example, if the message needs to add additional content in the future or to reschedule the message at a different time.

When a message is dequeued, the message is present both in the queue of the scheduler and in the consumer. In some example embodiments, the scheduler re-schedules the message to be processed in the future (e.g., in five minutes). This way, if the message is not updated or deleted within that time, the message will be processed again, assuming that the consumer failed in the processing of the message. This way, the scheduler does not need to keep checking on the availability of the consumer to process messages.

In some example embodiments, the dequeue request includes constraints associated with the messages desired, such as a count on the number of messages to be transferred, an expiration time, a visibility timeout, a consumer ID, etc.

One scenario where the update is used is when the consumer has partially completed the processing of the message, but an error takes place during the processing. The consumer generates the update to reschedule the message for reprocessing. For example, the consumer committed to work on the message for the next five minutes in order to send it to an email provider. However, the consumer receives a timeout from the email provider after one second. The consumer then issues the update to reprocess after 30 seconds.

The requests include metadata and a payload (e.g., a message). In some commands, the return result includes an ID, such as the message ID. In some example embodiments, the Application Programming Interface (API) for the scheduler includes the following commands described below in Table 1.

TABLE 1

| Method | Description |
| --- | --- |
| Enqueue(metadata, payload, scheduleTime) | Adds a message to the queue and the metadata indicates the location in the queue hierarchy. Also, it can be used to update schedule time or payload of an existing message. |

TABLE 1-continued

| Method | Description |
| --- | --- |
| Dequeue(metadata, count, visibilityTimeout) | Retrieves up to count number of messages and reschedules them to be retried after the visibility timeout. The ordering of messages returned will depend on the queue hierarchy and queue types |
| DeleteByID(metadata, id) | Deletes a message. The worker calls this command when it is finished processing a message. |
| DeleteByMetadata(metadata) | Deletes the queue specified by the metadata. |
| PeekByID(metadata, id) | View a single message |
| PeekByMetadata(metadata) | View all messages matching the metadata |
| Count(metadata) | Count the number of messages |
| CountDelayed(metadata) | Count the number of messages that are past their scheduled time |
| SetRateLimit(metadata, rate, time) | Throttle the number of messages per time for a subqueue specified by metadata |

In some example embodiments, the scheduler supports the following data types described below in Table 2.

TABLE 2

| Data type | Description |
| --- | --- |
| Metadata | map[string]string, used for specifying the location of a subqueue in the queue hierarchy. |
| Message ID | Opaque string used for uniquely identifying a message within an SGS partition |
| Partition ID | String used for uniquely identifying a partition to allow the SGS scheduler to scale out |
| Visibility timeout | The amount of time after a message is dequeued before it becomes available for processing again. |

The metadata comprises the message ID, the partition ID, and a location, which define where in the hierarchy the message is. The ID gives the routing information for the distributed queuing system and the data may live on a specific partition.

When the consumer sends the dequeue request, the consumer provides a metadata constraint and the scheduler returns a list of tuples that include the ID, the payload, metadata, and other information (if needed) that allows the consumer to do some work. For example, the consumer could send a request, "send me up to 10 messages for user ID 1." In another common use case, metadata is not specified, which will cause the return of any available message (subject to round-robin behavior).

It is noted that the embodiments illustrated in Tables 1 and 2 are examples and do not describe every possible embodiment. Other embodiments may utilize different commands or data types. The embodiments illustrated in Tables 1 and 2 should therefore not be interpreted to be exclusive or limiting, but rather illustrative.

Figure 4:
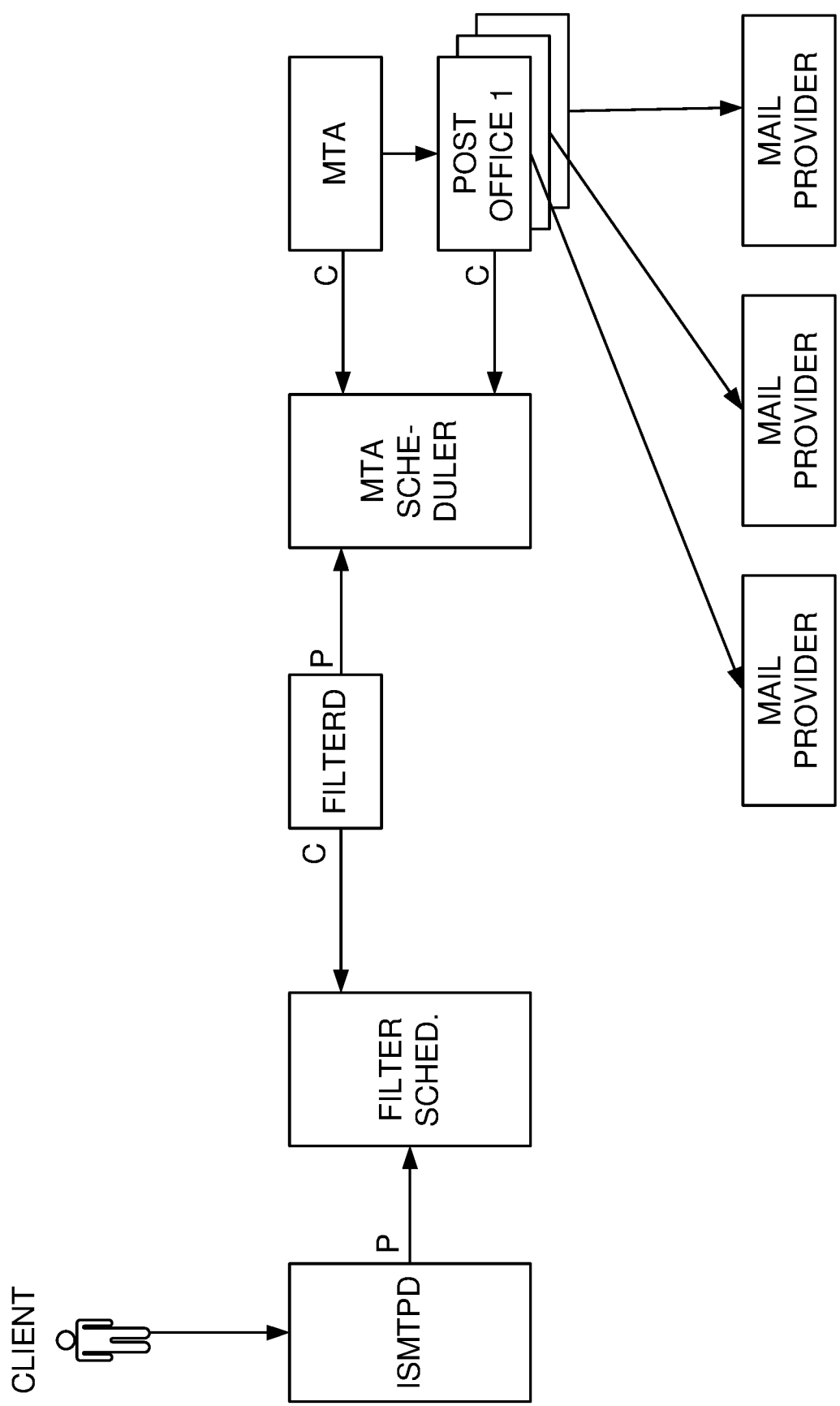
FIG. 4 is a high-level architecture for processing messages, according to some example embodiments.

FIG. 4 is a high-level architecture for processing messages, according to some example embodiments. The client sends a message to ISMTPD, which is the incoming server for processing SMTP (Simple Mail Transfer Protocol) requests.

ISMTPD pushes messages to the Filter Scheduler, which is the scheduler for FilterD. In this case, the ISMTPD is a producer for the Filter Scheduler. FilterD performs filtering and aggregation to the messages, such as adding a From field to the message or generating multiple messages to be sent out for a single request. For example, send 100 emails to our customer list.

FilterD is the consumer for the Filter Scheduler. FilterD transfers the messages to be sent out to the mail transfer agent (MTA) Scheduler. Therefore, FilterD is a producer for the MTA Scheduler.

In some example embodiments, different types of workers (e.g., consumers) may access the MTA Scheduler to process messages. One or more post office consumers may be used to send messages out to the corresponding mail service providers. Further, a mail transfer agent (MTA) can also retrieve messages, for any of the service providers, and then transfer the messages to one of the service providers for processing (e.g., sending to Gmail or Hotmail).

Figure 5:
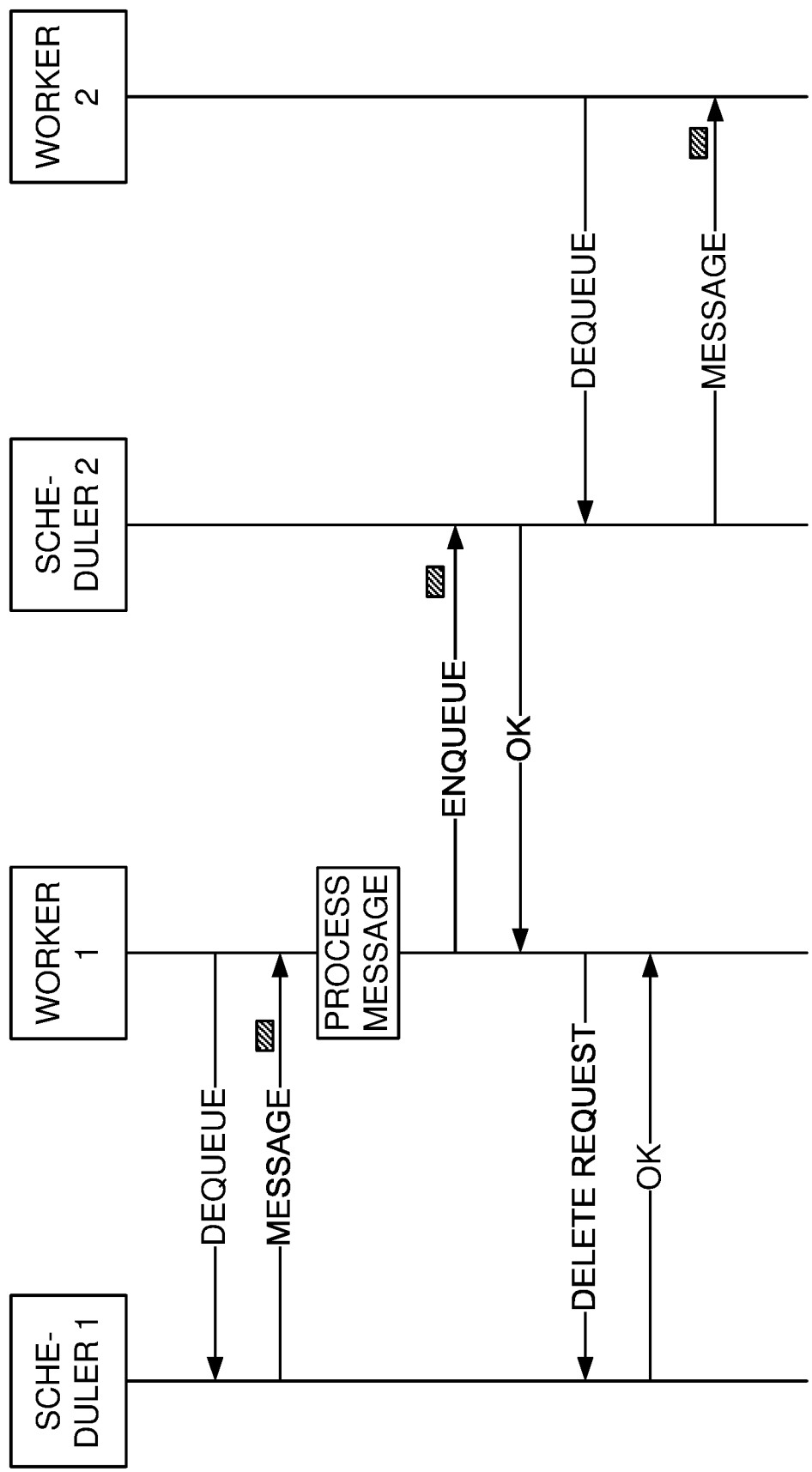
FIG. 5 illustrates the processing of messages using two schedulers, according to some example embodiments.

FIG. 5 illustrates the processing of messages using two schedulers, according to some example embodiments. Multiple schedulers are used at different processing stages to control the flow of the messages through the system.

For example, worker 1 dequeues messages from scheduler 1, performs some processing and then enqueues the message for scheduler 2. Accordingly, worker 1 is a consumer for scheduler 1 and a producer for scheduler 2.

After worker 1 finishes processing the message, a delete request is sent to a scheduler 1 to remove the message from the scheduler 1. A confirmation of the deletion is sent from scheduler 1 to worker 1. Worker 2 dequeues the message from scheduler 2 for further processing.

Figure 6:
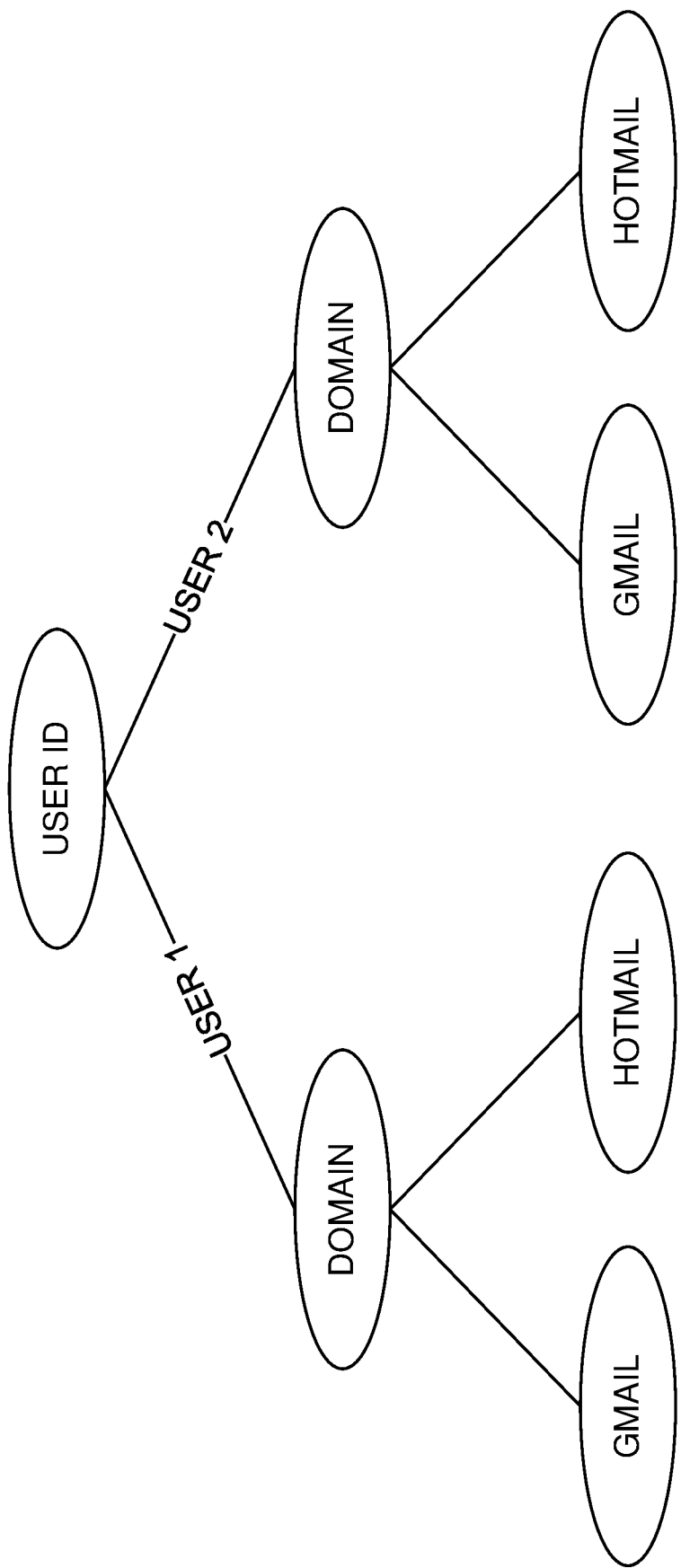
FIG. 6 illustrates a scheduler hierarchy, according to some example embodiments.

FIG. 6 illustrates a scheduler hierarchy, according to some example embodiments. FIG. 6 shows a simple hierarchy where the top level is for the user ID and the next level is for the email domain. In this case there are two users, user 1 and user 2, and two email domains, Gmail and Hotmail.

If a consumer wants to obtain messages for user 1, then the hierarchy will be recursively searched on the left side of the tree that corresponds to user 1. Similarly, for an enqueue, the messages for user 1 will be added on the left side of the tree: messages going to Gmail would be on the Gmail node and messages going to Hotmail would be on the Hotmail node (e.g., a heap queue).

In some example embodiments, the API for enqueueing and dequeuing is the same; when a producer enqueues a message, the hierarchical tree is parsed starting from the top and going towards the bottom, and when a consumer requests a message, the hierarchical tree is also parsed from the top and going towards the bottom until a message, or messages, is found meeting the requirements for the dequeue operation. Of course, if no messages are found meeting the requirements set up in the metadata of the request, a notification is passed to the consumer that no messages are available.

Each of the different levels in the hierarchy may have different types of queueing components, as discussed in more detail below regarding FIG. 7. Each of the levels is configurable based on the configuration used to initialize the hierarchy, as discussed in more details below with reference to FIG. 10.

In some example embodiments, each level in the hierarchy is identified by a string key, but other types of identifiers may be used. A message maps into the hierarchy based on key-value pairs in its metadata. Message operations use metadata to allow the scheduler to find the queue where the message is stored.

FIG. 7 shows queuing components available in the hierarchical scheduler, according to some example embodiments. Each row in the hierarchy may include a different type of queueing component.

In some example embodiments, the queuing components are selected from the group consisting of a heap queue, a round-robin queue, a rate-limit queue, a concurrency queue, and a worker-concurrency queue.

The heap queue schedules messages for a certain period of time (e.g., in five minutes, at midnight, tomorrow, next Monday). For example, a message may be scheduled to be sent at 10 AM the next day, or a message may be scheduled to be sent "now," meaning that the message is ready to be processed and will be queued with all the messages waiting to be processed right away.

The queuing component hierarchy parses the sub-components in the tree, until a leaf node is reached. For example, a heap queue is a leaf node that stores messages until they are ready to be delivered and picked up by one of the consumers.

The round-robin queue schedules request from multiple requesters in circular order, such that service is provided for each of the requesters in a circular order, e.g., first user, second user, third user, . . . , last user, and the cycle repeats starting with the first user.

The round-robin queue provides further queuing for multiple users, e.g., all customers have the same access to the mail sender's capacity. In some levels of the hierarchy, the round-robin queue may be a round-robin queue of queues, that is, the round-robin queue stores queues instead of messages. When a message is being dequeued from the round-robin queue, one of the queues within the round-robin queue is selected and an element from the selected queue is dequeued. Other queueing components may also be used to queue queues.

A rate-limit queue enforces rate limits on the amount of messages that can be processed within a period of time (e.g., five messages per minute). That is, the rate-limit queue delivers a message being requested if delivering the message would not violate the rate limit.

The rate limit queue keeps track of the times of service of the different elements in order to enforce the rate limits. In a sense, the rate-limit queue acts as a switch that enables elements to be processed when processing the elements would not brake the rate limit. On the other hand, if the rate limit for a period has been reached, the switch will not allow any message to be processed until a certain amount of time passes so the rate limit is not exceeded.

The concurrency queue enforces limits on the number of messages inflight at a given time. The inflight messages are those messages that have been dequeued but not yet deleted from the scheduler. Thus, the concurrency queue ensures that only a certain number of messages are processed at a given time. For example, the concurrency queue may set a limit of 100 messages inflight at a given time and will not dequeue more messages if the limit of 100 inflight messages is reached.

Thus, the concurrency queue may be used to control the bandwidth used by the queue in the system. For example, to limit the amount of bandwidth used by user 1.

The worker-concurrency queue enforces limits on the number of consumers (e.g., workers) active at a given time processing messages. More details on the worker-concurrency queue are provided below with reference to FIG. 8.

Each of the levels in the hierarchy expose the API interface so producers and consumers interact with the corresponding queue. The producer sends a message and includes the metadata that is associated with this hierarchy. When the enqueue is performed, the producer provides the key value pairs for each of the metadata points. The scheduler creates sub-queue structures based on the metadata that is provided at the enqueue.

The parameters of the different queuing components may be reconfigured at any time, such as by changing rate limits or worker concurrency.

When a system administrator configures the hierarchical scheduler, the system administrator provides a configuration that defines the hierarchy and its different levels. The configuration provides an order of combinations of these different types of queue abstractions that will be built according to the configuration. For example, a configuration file may define a round-robin queue for the user ID, a rate-limit queue, to control user bandwidth, and a heap queue to store the messages.

Figure 8:
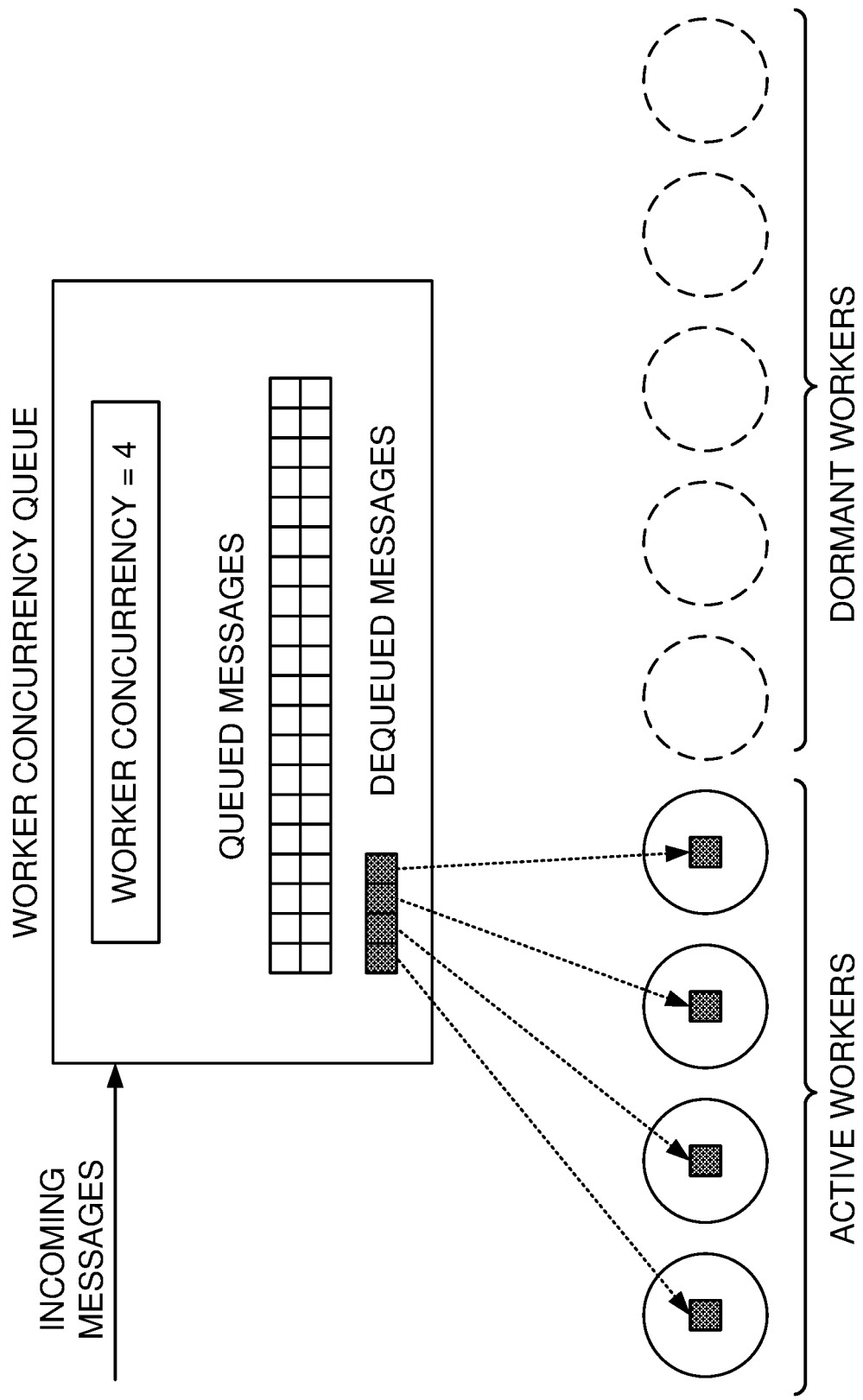
FIG. 8 illustrates the operation of a worker concurrency queue, according to some example embodiments.

FIG. 8 illustrates the operation of a worker concurrency queue, according to some example embodiments. A worker concurrency queue, also referred herein as a worker concurrency throttler because it does not store messages, throttles the number of concurrent workers, where the workers are defined as one of the consumers. That is, the worker concurrency queue limits the number of active consumers.

In the example illustrated in FIG. 8, a worker concurrency queue is set to a maximum of four active workers. At a given point in time, only the four active workers will be processing messages. It is noted that an active worker may have more than one message being processed.

For example, there could be 10,000 different workers in the scheduling system, but the administrator wants a maximum of five workers at any given time for a particular user. The worker concurrency queue provides this type of throttling mechanism, even though the workers may be working on many tasks, including messages from other users.

Some email domains may limit the number of connections (e.g., 5) and the worker concurrency queue may be used to implement this type of limitation. Each worker represents a single connection and the concurrency is for limiting the number of active connections to the email domain.

In existing networking systems, these types of limitations may be implemented by requesting connections and then being denied by the email domain. In this case, concurrency throttling (and rate limiting) is done internally to a queue, instead of at the edge of the queue and relying on outside entities for flow control.

Figure 9:
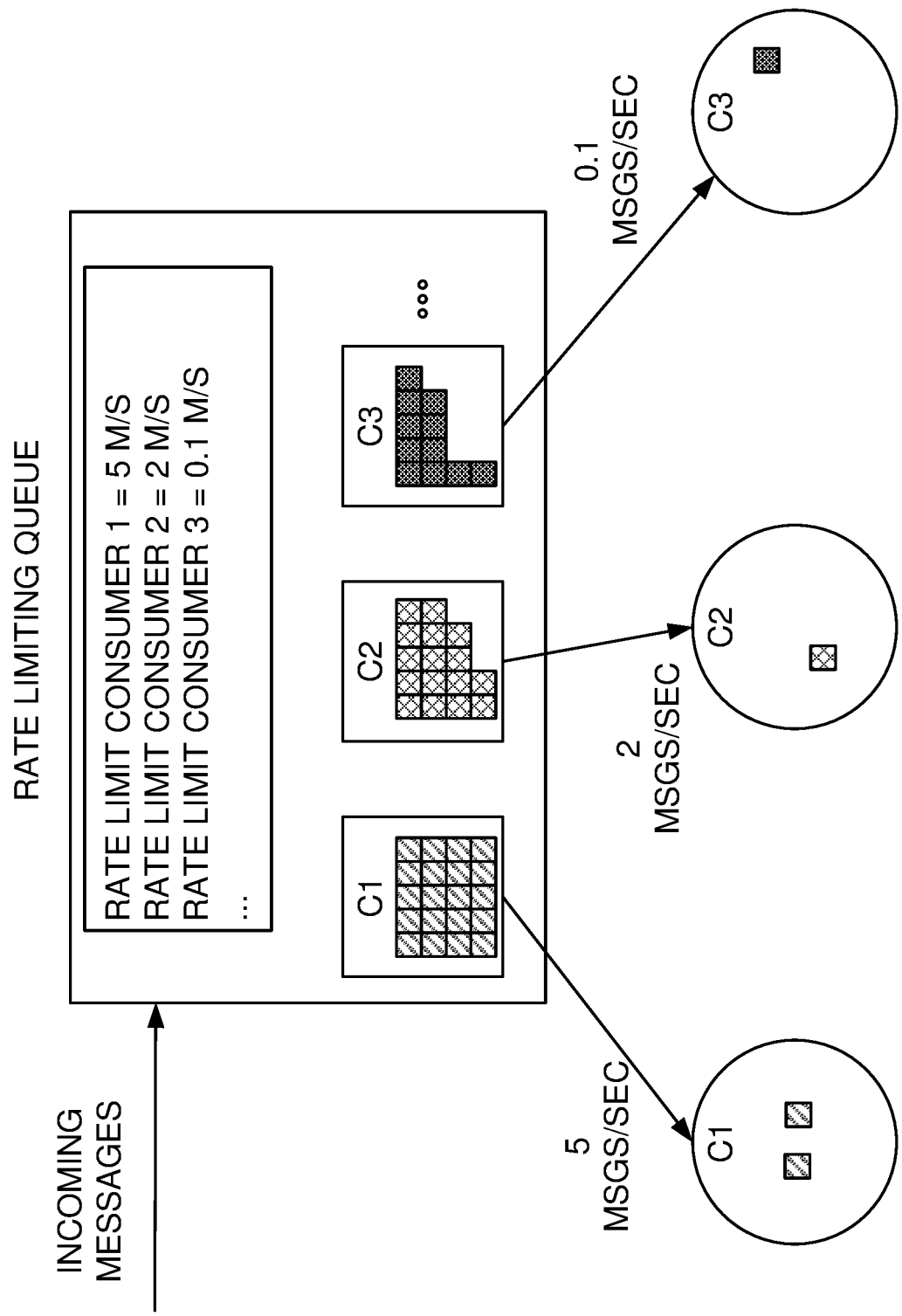
FIG. 9 illustrates the operation of a rate-limiting queue, according to some example embodiments.

FIG. 9 illustrates the operation of a rate-limiting queue, according to some example embodiments. The rate-limiting queue is configured by specifying a message count per interval of time over a period. The rate limits may be applied to any queue within the scheduler hierarchy.

The rate limiting queue, also referred to herein as a rate limiter throttler because it does not store messages, may be used, for example, to limit the amount of suspicious traffic that may be generated by spammers that abuse the email system. By setting up the rate limit, abusers may be controlled to protect the performance of the overall system for all users.

The rate-limiting queue works well for asynchronously scheduled work payloads and unburdens the end users from having to maintain states for retries.

Figure 10:
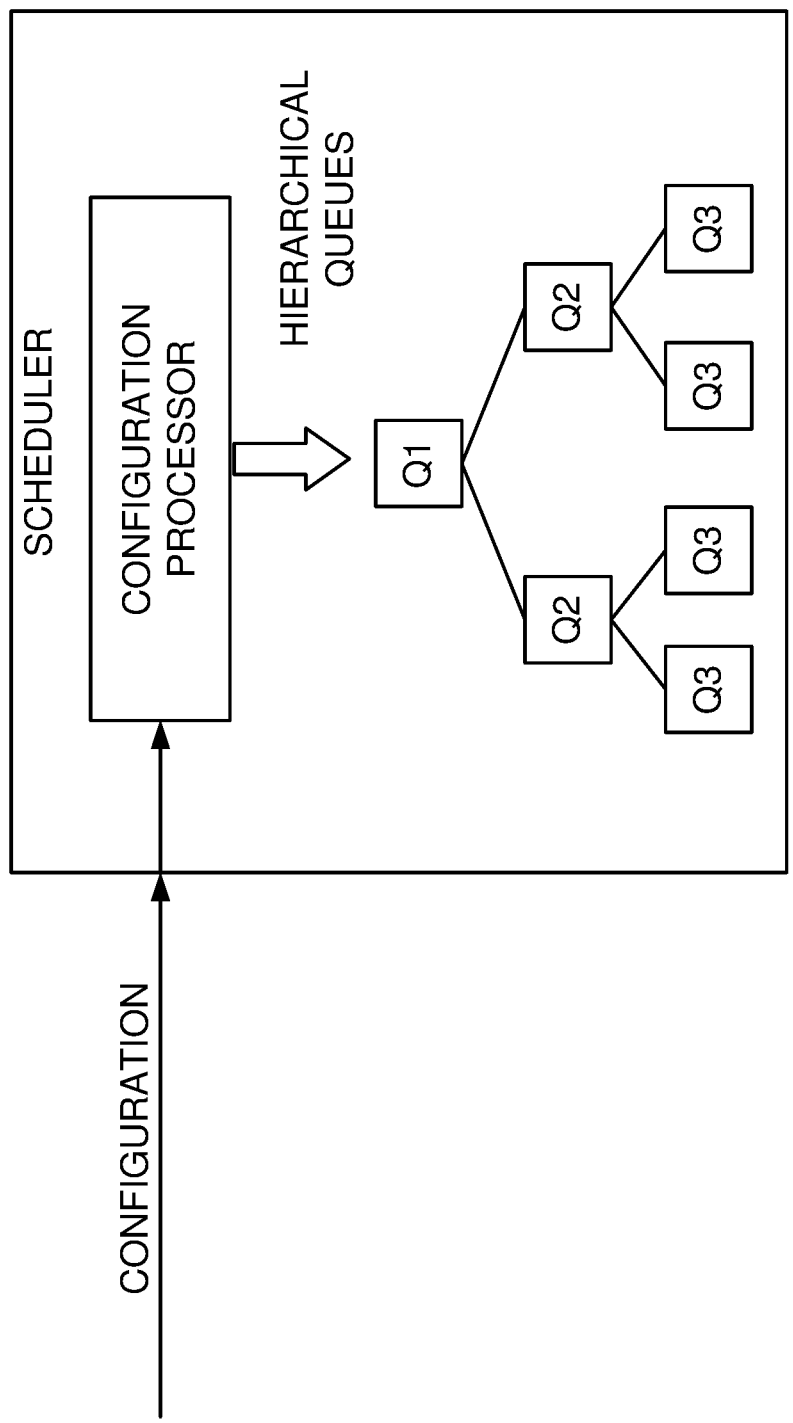
FIG. 10 illustrates the process of configuring the scheduler with hierarchical queues, according to some example embodiments.

FIG. 10 illustrates the process of configuring the scheduler with hierarchical queues, according to some example embodiments. The scheduler receives a configuration and the hierarchical queueing structures are built based on the configuration by combining different queuing components.

A configuration processor receives the configuration, parses the configuration, and creates the hierarchical queues, including the creation of the storage structures for storing the messages. There are two types of updates to the configuration: static and dynamic. The static updates to the configuration will cause the corresponding updates to the hierarchical queues, such as changing rate limits and worker concurrency. The dynamic updates change parameters of the configuration, such as "set maximum rate to 5 messages per second for user 1 on gmail.com."

In some example embodiments, the hierarchy is uniform across the different levels, such as the number of levels and what type of component is configured at each level. However, the branching and dynamic configuration parameters will be different for each queue based on configuration parameters. For example, the hierarchy to manage messages from user 1 has a different number of IP pools than for user 2.

After the hierarchy is created, the scheduler is ready to receive messages. One of the benefits of the hierarchical scheduler is that producers can generate messages and the scheduler will receive those messages, even if those messages cannot be processed for a period of time, or even when resources down the chain of communication are not available. The flow control for other queuing systems are based on temporarily shutting down when there are no resources to process the message, but the hierarchical scheduler will continue accepting messages for as long as there is storage capacity.

The hierarchical scheduler will determine the constraints on the messages and process them accordingly, such as processing an email to be sent the next day at 11 PM.

The configurable hierarchy, including the queuing components, provides a powerful tool to quickly set up queuing systems with a variety of different types of constraints, such as rate limits, worker limits, scheduling for the future, etc. Further, future enhancements to the system may be performed simply by updating the configuration. If a particular scheduler is not performing well for certain users (e.g., heavy users are monopolizing the system) the hierarchy may be modified to implement round-robin capabilities among the different users, or by adding rate limits to the heavy users.

In another example, the system administrator wants to pull messages faster for a particular IP with a connection to a certain email domain. The system administrator adds a round-robin queue to manage this connection to the particular IP and the problem is solved.

Further, traditional queuing systems do not have the tools provided by the queuing components, such as rate limits, worker concurrency, and inflight concurrency.

Large queuing systems are challenging when the system administrator has to deal with many constraints, such as email providers that can take hundreds of emails a minute to others that might take five emails a minute. Also, a messaging system with many different clients has to be able to provide fairness to all the clients to satisfy the service levels requirements. It is important to ensure that users do not abuse the system by monopolizing resources (e.g., sending spam emails on Black Friday).

This type of large queuing system typically goes through a tuning process to identify problems and bottlenecks in the system, starting with a low number of messages and then increasing the processing capacity. This is because processing emails becomes more challenging as the number increases. For example, it is much more challenging to process ten million emails a day than a hundred emails a day.

The scheduler provides debugging tools such as the ability to get information on the hierarchy, the queues, the messages, performance metrics (e.g., how long a message waited on a queue), etc. As the system grows, the system administrator uses debugging tools to identify bottlenecks and take adequate measurements, such as adding rate limits, increasing the number of workers for certain queues, etc.

For example, a user may be frustrated because it takes too long to process the user's messages. Users have the expectation that if a message is sent to be processed, then the message should be sent quickly. However, messages may sometimes suffer long delays. The system administration may determine that one level in the hierarchy is causing too much delay because a user is sending too many emails at a specific time (e.g., noon). By rate limiting this user, the system may then be reconfigured to improve performance for all users. The user sending too many emails at one time will have the expectation that it will take some time to process all the emails, so user satisfaction will not be a problem for any of the users.

In some example embodiments, the configuration is defined by the metadata, which is a hash of key value pairs. For example:

```
{
    uid: 1,
    domain: "gmail.com",
    IP_pool:2,
}
```

This configuration will create an email domain for Gmail for user 1 and two IP addresses for connecting to Gmail. Further, wildcards may be used for dequeuing messages (but not for enqueueing), such as the following:

```
{
    uid: *,
    domain: "gmail.com",
    IP_pool:*,
}
```

This metadata will generate Gmail domain workers for all users with at least one IP address. Further, some of the parameters may be associated with default values, and if a value is not submitted, the default value will be used.

Figure 11:
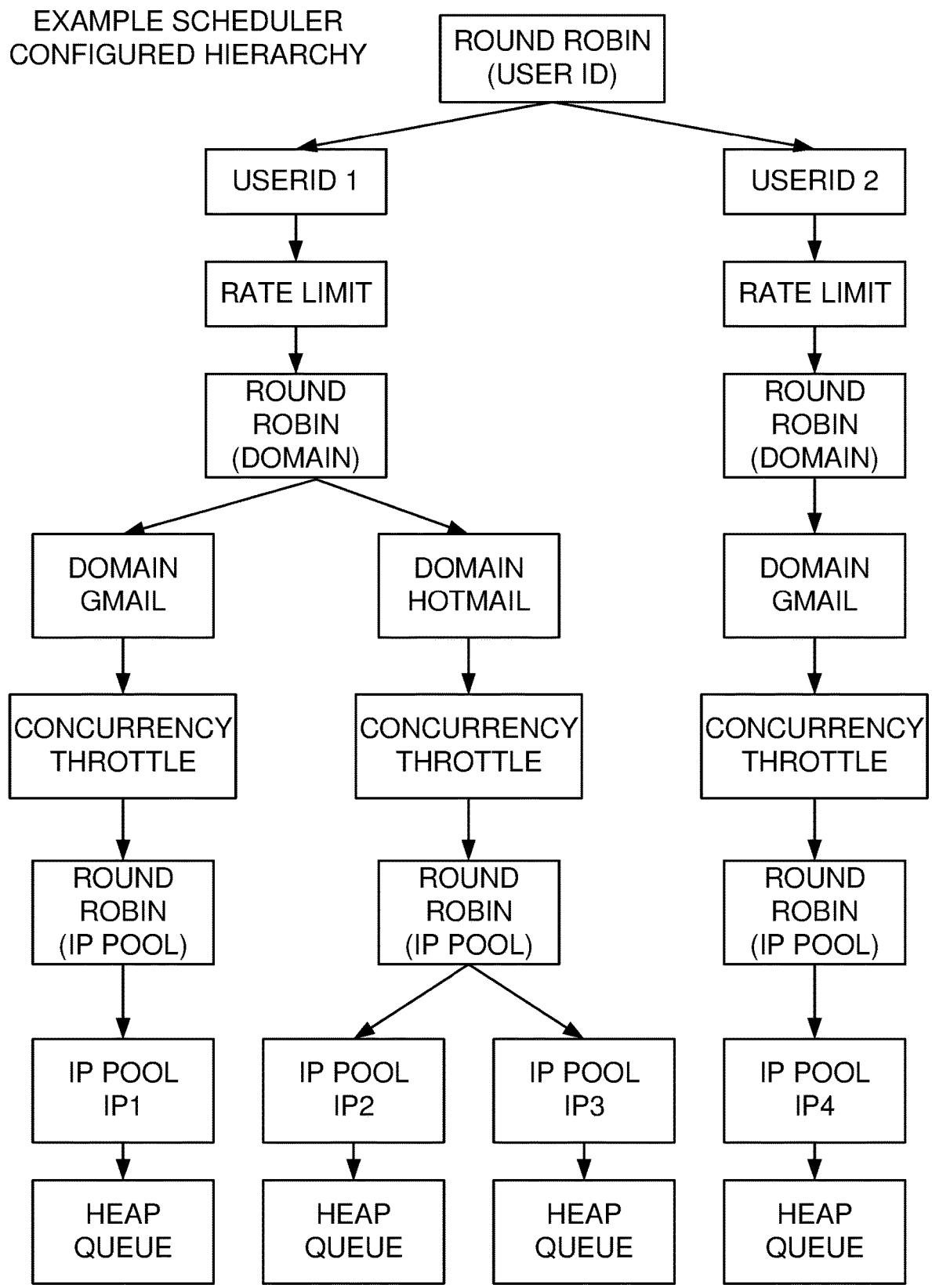
FIG. 11 is an exemplary scheduler hierarchy.

FIG. 11 is an exemplary scheduler hierarchy. The scheduler is for a mail-sender queue. At the root, on the top, a round-robin queue is configured by user ID. In this example, two users are illustrated, but the scheduler may be configured for a larger number of users.

At the next level below, a rate-limit queue is implemented to limit the processing rate for each of the users. The rate limits for the users may be the same or may be configured with different rate limits.

At the next level below, the round-robin queue is configured for the different domains. User 1 has Gmail and Hotmail domains while user 2 has the Gmail domain.

At the next level below, worker concurrency queues limit the number of inflight messages for each domain. Further yet, in the next level below, round-robin queues are configured for the different IP pools. That is, robin queues are configured for the IP addresses used to connect to the different email domains.

In the illustrated example, the Gmail domain of user 1 has one IP address, the Hotmail domain of user 1 has two IP addresses, and the Gmail domain for user 2 has one IP address. For example, user 1 may wish to send company messages through IP2 and marketing messages using IP3.

Further, at the bottom of the hierarchy, heap queues store the actual messages. The heap queues will select messages that are ready to be processed but will wait for the proper time to process messages that have been scheduled for the future.

In some example embodiments, the system keeps track of events, such as when the user reads an email, when the user deletes an image, etc. For a large system, the number of events over time may grow very fast, but a hierarchical scheduler properly configured for managing events is able to store and process the large number of events.

Figure 12:
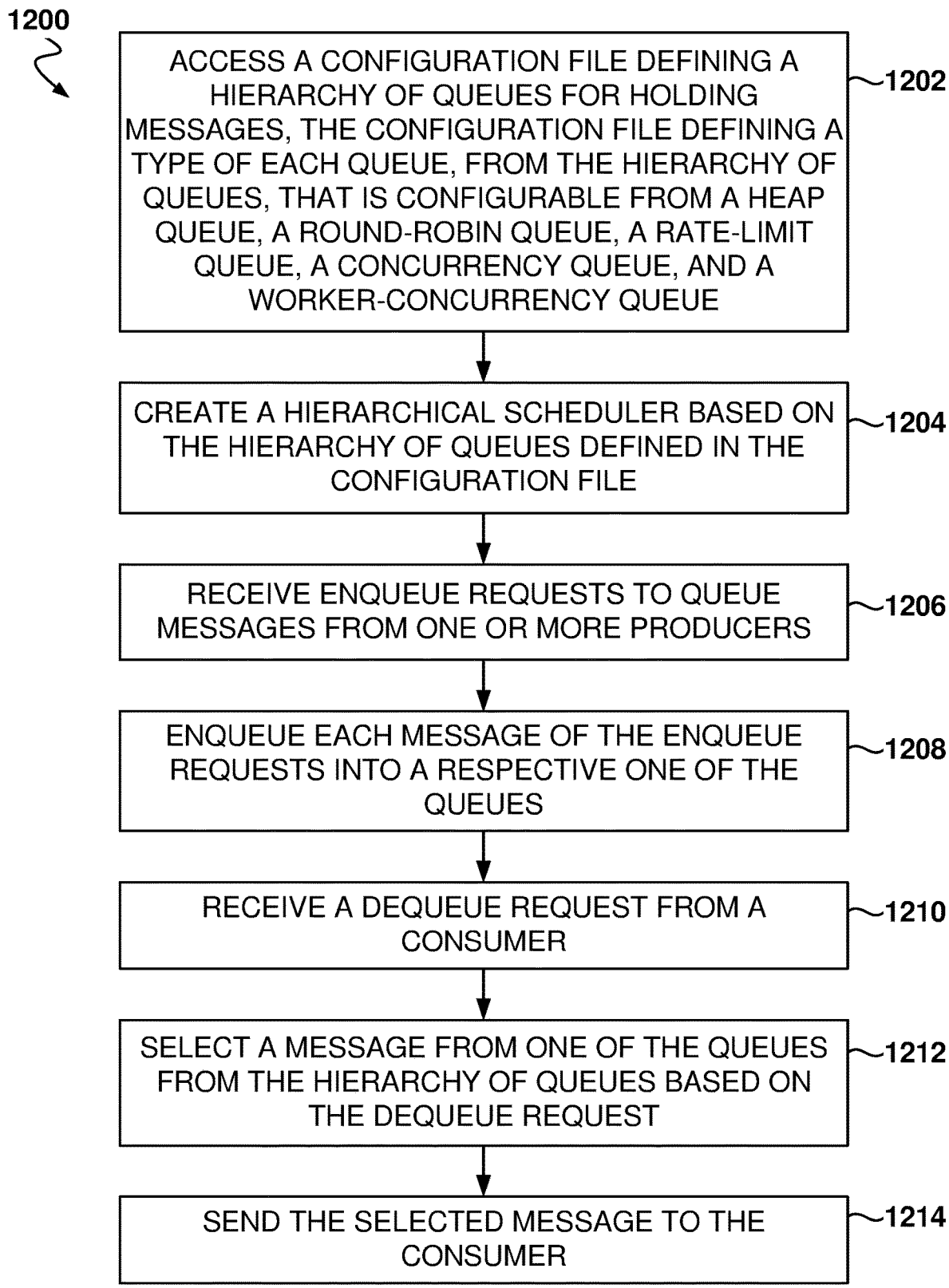
FIG. 12 is a flowchart of a method for implementing configurable hierarchical schedulers with multiple levels, where each level may use one of several types of queueing mechanisms, according to some example embodiments

FIG. 12 is a flowchart of a method 1200 for implementing configurable hierarchical schedulers with multiple levels, where each level may use one of several types of queueing mechanisms, according to some example embodiments.

Operation 1202 is for accessing, by one or more processors, a configuration file defining a hierarchy of queues for holding messages, wherein the configuration file defines a type of each queue from the hierarchy of queues, the type of each queue being configurable from a heap queue, a round-robin queue, a rate-limit queue, a concurrency queue, and a worker-concurrency queue.

From operation 1202, the method 1200 flows to operation 1204 where the one or more processors create a hierarchical scheduler based on the hierarchy of queues defined in the configuration file.

From operation 1204, the method 1200 flows to operation 1206 for receiving, by the hierarchical scheduler, enqueue requests to queue messages from one or more producers.

From operation 1206, the method 1200 flows to operation 1208 where the hierarchical scheduler enqueues each message of the enqueue requests into a respective one of the queues from the hierarchy of queues based on the respective enqueue request and the hierarchy of queues.

At operation 1210, the hierarchical scheduler receives a dequeue request from a consumer.

From operation 1210, the method 1200 flows to operation 1212 where the hierarchical scheduler selects a message from one of the queues from the hierarchy of queues based on the dequeue request.

From operation 1212, the method 1200 flows to operation 1214 where the hierarchical scheduler sends the selected message to the consumer.

In one example, the rate-limit queue enforces rate limits on an amount of messages that can be processed per period of time.

In one example, the heap queue is a leaf node in the hierarchy of queues for storing messages until ready to be picked up by the consumer.

In one example, the concurrency queue enforces limits on a number of inflight messages, the inflight messages being messages that have been dequeued by the consumer or another consumer but not yet deleted from the hierarchical scheduler.

In one example, the worker-concurrency queue enforces limits on a number of consumers active at a given time processing messages from the worker-concurrency queue.

In one example, the worker-concurrency queue is configured for limiting a number of active connections to an email domain, each worker representing a single connection to the email domain.

In one example, the method 1200 further comprises detecting that an amount of time since sending the selected message to the consumer is above a predetermined amount of time, and placing, in response to the detecting, the selected message back in the queue.

In one example, the method 1200 further comprises receiving a delete request for the selected message from the consumer, and deleting the selected message from the hierarchical scheduler.

In one example, the dequeue request includes constraints associated with messages desired by the consumer, the constraints including one of a count on a number of messages to be dequeued, an expiration time, a visibility timeout, and a consumer identifier.

In one example, the hierarchy of queues includes a plurality of layers in a tree-like structure.

Another general aspect is for a system that includes a memory comprising instructions and one or more computer processors. The instructions, when executed by the one or more computer processors, cause the one or more computer processors to perform operations comprising: accessing a configuration file defining a hierarchy of queues for holding messages, wherein the configuration file defines a type of each queue that is configurable from a heap queue, a round-robin queue, a rate-limit queue, a concurrency queue, and a worker-concurrency queue; creating a hierarchical scheduler with the hierarchy of queues defined in the configuration file; enqueueing, by the hierarchical scheduler, incoming messages received from one or more producers into a respective queue based on properties of each message and the hierarchy of queues; receiving, by the hierarchical scheduler, a dequeue request from a consumer; selecting a message from one of the queues based on the dequeue request; and sending the selected message to the consumer.

In yet another general aspect, a machine-readable storage medium (e.g., a non-transitory storage medium) includes instructions that, when executed by a machine, cause the machine to perform operations comprising: accessing a configuration file defining a hierarchy of queues for holding messages, wherein the configuration file defines a type of each queue that is configurable from a heap queue, a round-robin queue, a rate-limit queue, a concurrency queue, and a worker-concurrency queue; creating a hierarchical scheduler with the hierarchy of queues defined in the configuration file; enqueueing, by the hierarchical scheduler, incoming messages received from one or more producers into a respective queue based on properties of each message and the hierarchy of queues; receiving, by the hierarchical scheduler, a dequeue request from a consumer; selecting a message from one of the queues based on the dequeue request; and sending the selected message to the consumer.

Figure 13:
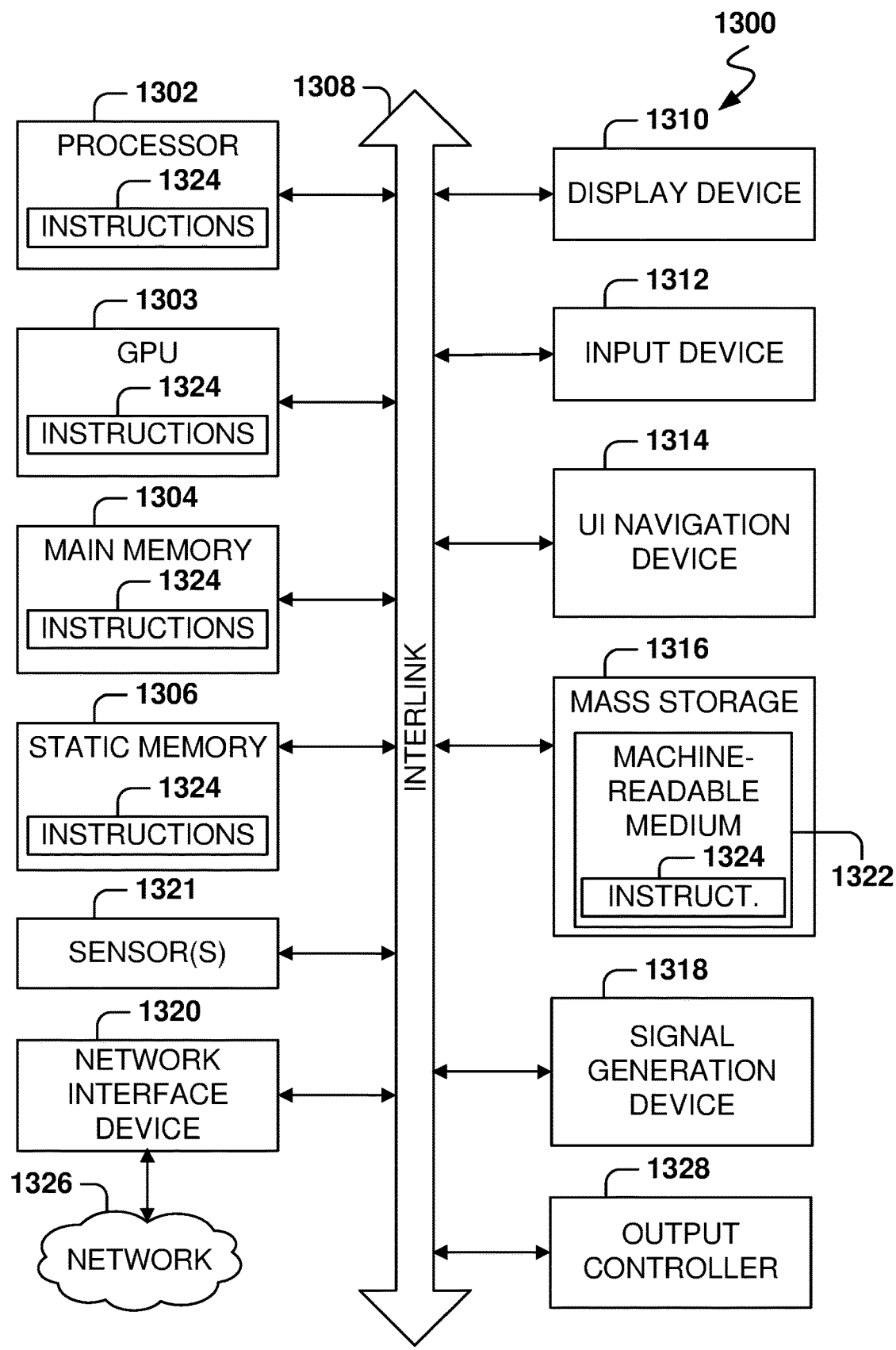
FIG. 13 is a block diagram illustrating an example of a machine upon or by which one or more example process embodiments described herein may be implemented or controlled.

FIG. 13 is a block diagram illustrating an example of a machine 1300 upon or by which one or more example process embodiments described herein may be implemented or controlled. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1300 may include a hardware processor 1302 (e.g., a central processing unit (CPU), a hardware processor core, or any combination thereof), a graphics processing unit (GPU) 1303, a main memory 1304, and a static memory 1306, some or all of which may communicate with each other via an interlink (e.g., bus) 1308. The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device (e.g., drive unit) 1316, a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1316 may include a machine-readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within the static memory 1306, within the hardware processor 1302, or within the GPU 1303 during execution thereof by the machine 1300. In an example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium, or multiple media, (e.g., a centralized or distributed database, and/or associated caches and servers) configured to store the one or more instructions 1324.

The term "machine-readable medium" may include any medium that is capable of storing, encoding, or carrying instructions 1324 for execution by the machine 1300 and that cause the machine 1300 to perform any one or more of the techniques of the present disclosure, or that is capable of storing, encoding, or carrying data structures used by or associated with such instructions 1324. Non-limiting machine-readable medium examples may include solid-state memories, and optical and magnetic media. In an example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may further be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

accessing, by one or more processors, a configuration file defining a hierarchy of queues for holding messages, wherein the configuration file defines a type of each queue from the hierarchy of queues, the type of each queue being configurable from a heap queue, a round-robin queue, a rate-limit queue, a concurrency queue, and a worker-concurrency queue;

creating, by the one or more processors, a hierarchical scheduler based on the hierarchy of queues defined in the configuration file;

receiving, by the hierarchical scheduler, enqueue requests to queue messages from one or more producers;

enqueueing, by the hierarchical scheduler, each message of the enqueue requests into a respective one of the queues from the hierarchy of queues based on the respective enqueue request and the hierarchy of queues;

receiving, by the hierarchical scheduler, a dequeue request from a consumer, wherein the dequeue request includes constraints associated with messages desired by the consumer, the constraints including one of a count on a number of messages to be dequeued, an expiration time, a visibility timeout, and a consumer identifier;

selecting, by the hierarchical scheduler, a message from one of the queues from the hierarchy of queues based on the dequeue request; and sending, by the hierarchical scheduler, the selected message to the consumer.

2. The method as recited in claim 1, wherein the rate-limit queue enforces rate limits on an amount of messages that can be processed per period of time.

3. The method as recited in claim 1, wherein the heap queue is a leaf node in the hierarchy of queues for storing messages until ready to be picked up by the consumer.

4. The method as recited in claim 1, wherein the concurrency queue enforces limits on a number of inflight messages, the inflight messages being messages that have been dequeued by the consumer or another consumer but not yet deleted from the hierarchical scheduler.

5. The method as recited in claim 1, wherein the worker-concurrency queue enforces limits on a number of consumers active at a given time processing messages from the worker-concurrency queue.

6. The method as recited in claim 5, wherein the worker-concurrency queue is configured for limiting a number of active connections to an email domain, each worker representing a single connection to the email domain.

7. The method as recited in claim 1, further comprising:

detecting that an amount of time since sending the selected message to the consumer is above a predetermined amount of time; and placing, in response to the detecting, the selected message back in the queue.

8. The method as recited in claim 1, further comprising:
receiving a delete request for the selected message from the consumer; and
deleting the selected message from the hierarchical scheduler.

9. The method as recited in claim 1, wherein the hierarchy of queues includes a plurality of layers in a tree-like structure.

10. A system comprising:
a memory comprising instructions; and
one or more computer processors, wherein the instructions, when executed by the one or more computer processors, cause the system to perform operations comprising:

accessing a configuration file defining a hierarchy of queues for holding messages, wherein the configuration file defines a type of each queue from the hierarchy of queues, the type of each queue being configurable from a heap queue, a round-robin queue, a rate-limit queue, a concurrency queue, and a worker-concurrency queue;

creating a hierarchical scheduler based on the hierarchy of queues defined in the configuration file;

receiving, by the hierarchical scheduler, enqueue requests to queue messages from one or more producers;

enqueueing, by the hierarchical scheduler, each message of the enqueue requests into a respective one of the queues from the hierarchy of queues based on the respective enqueue request and the hierarchy of queues;

receiving, by the hierarchical scheduler, a dequeue request from a consumer, wherein the dequeue request includes constraints associated with messages desired by the consumer, the constraints including one of a count on a number of messages to be dequeued, an expiration time, a visibility timeout, and a consumer identifier;

selecting, by the hierarchical scheduler, a message from one of the queues from the hierarchy of queues based on the dequeue request; and sending, by the hierarchical scheduler, the selected message to the consumer.

11. The system as recited in claim 10, wherein the rate-limit queue enforces rate limits on an amount of messages that can be processed per period of time.

12. The system as recited in claim 10, wherein the heap queue is a leaf node in the hierarchy of queues for storing messages until ready to be picked up by the consumer.

13. The system as recited in claim 10, wherein the concurrency queue enforces limits on a number of inflight messages, the inflight messages being messages that have been dequeued by the consumer or another consumer but not yet deleted from the hierarchical scheduler.

14. The system as recited in claim 10, wherein the worker-concurrency queue enforces limits on a number of consumers active at a given time processing messages from the worker-concurrency queue.

15. A non-transitory machine-readable storage medium including instructions that, when executed by a machine, cause the machine to perform operations comprising:

accessing a configuration file defining a hierarchy of queues for holding messages, wherein the configuration file defines a type of each queue from the hierarchy of queues, the type of each queue being configurable from a heap queue, a round-robin queue, a rate-limit queue, a concurrency queue, and a worker-concurrency queue;

creating a hierarchical scheduler based on the hierarchy of queues defined in the configuration file;

receiving, by the hierarchical scheduler, enqueue requests to queue messages from one or more producers;

enqueueing, by the hierarchical scheduler, each message of the enqueue requests into a respective one of the queues from the hierarchy of queues based on the respective enqueue request and the hierarchy of queues;

receiving, by the hierarchical scheduler, a dequeue request from a consumer, wherein the dequeue request includes constraints associated with messages desired by the consumer, the constraints including one of a count on a number of messages to be dequeued, an expiration time, a visibility timeout, and a consumer identifier;

selecting, by the hierarchical scheduler, a message from one of the queues from the hierarchy of queues based on the dequeue request; and sending, by the hierarchical scheduler, the selected message to the consumer.

16. The non-transitory machine-readable storage medium as recited in claim 15, wherein the rate-limit queue enforces rate limits on an amount of messages that can be processed per period of time.

17. The non-transitory machine-readable storage medium as recited in claim 15, wherein the heap queue is a leaf node in the hierarchy of queues for storing messages until ready to be picked up by the consumer.

18. The non-transitory machine-readable storage medium as recited in claim 15, wherein the concurrency queue enforces limits on a number of inflight messages, the inflight messages being messages that have been dequeued by the consumer or another consumer but not yet deleted from the hierarchical scheduler.

19. The non-transitory machine-readable storage medium as recited in claim 15, wherein the worker-concurrency queue enforces limits on a number of consumers active at a given time processing messages from the worker-concurrency queue.

* * * * *